(12) United States Patent
Sasaki et al.

(10) Patent No.: US 7,419,512 B2
(45) Date of Patent: Sep. 2, 2008

(54) ELECTRODE, BATTERY USING THE SAME AND METHOD FOR MANUFACTURING THE ELECTRODE

(75) Inventors: Yoshinari Sasaki, Kanagawa (JP); Koji Shimotoku, Kanagawa (JP); Hidehisa Murase, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/599,230

(22) Filed: Nov. 13, 2006

(65) Prior Publication Data

US 2007/0059603 A1    Mar. 15, 2007

Related U.S. Application Data

(62) Division of application No. 10/246,351, filed on Sep. 18, 2002, now Pat. No. 7,135,250.

(30) Foreign Application Priority Data

Sep. 20, 2001   (JP) .............................. 2001-287563

(51) Int. Cl.
*H01M 4/04* (2006.01)
*H01M 4/70* (2006.01)
(52) U.S. Cl. .................. 29/623.1; 29/623.5; 429/233
(58) Field of Classification Search .............. 29/2, 29/623.1, 623.5; 429/233
See application file for complete search history.

(56) References Cited

U.S. PATENT DOCUMENTS

| | | | |
|---|---|---|---|
| 5,498,489 A | 3/1996 | Dasgupta et al. | |
| 5,525,441 A | 6/1996 | Reddy et al. | |
| 6,045,943 A * | 4/2000 | Nowaczyk | ............... 429/160 |
| 6,120,563 A | 9/2000 | Kraft et al. | |
| 6,461,762 B1 | 10/2002 | Yang et al. | |

FOREIGN PATENT DOCUMENTS

JP        2002-216847        8/2002

* cited by examiner

*Primary Examiner*—Gregg Cantelmo
(74) *Attorney, Agent, or Firm*—Robert J. Depke; Rockey, Depke & Lyons, LLC (57) ABSTRACT

An electrode includes a composite mixture layer formed by applying a composite mixture having one of a cathode active material or an anode active material on one of main surfaces of a plurality of current collectors formed in substantially rectangular shapes; and a non-applied part to which the composite mixture is not applied at both end parts in the longitudinal direction. One current collector is connected to the other adjacent current collector at one end side in the longitudinal direction through a connecting part to which the composite mixture is not applied and which is provided continuously to the non-applied parts. In the electrode constructed as described above, a plurality of current collectors can be laminated to obtain a multi-layer structure and an electric current can be collected from a lead welded to only one end part of the current collector. Thus, the electrode of a new form having an excellent productivity and a high capacity can be provided.

5 Claims, 5 Drawing Sheets

ELECTRODE, BATTERY USING THE SAME AND METHOD FOR MANUFACTURING THE ELECTRODE

The subject matter of application Ser. No. 10/246,351 is incorporated herein by reference. The present application is a divisional of U.S. application Ser. No. 10/246,351, filed Sep. 18, 2002, now U.S. Pat. No. 7,135,250 which claims priority to Japanese Patent Application No. JP2001-287563, filed Sep. 20, 2001. The present application claims priority to these previously filed applications.

BACKGROUND OF THE INVENTION

1. Field of the Invention

The present invention relates to an electrode having a current collector and a composite mixture layer to which a composite mixture including one of a cathode active material and an anode active material is applied and a method for manufacturing the electrode, and more particularly to an electrode having a new electrode form and a method for manufacturing the electrode.

2. Description of the Related Art

As cordless and portable electronic devices have been increasingly developed, batteries employed as power sources for driving various types of electronic devices, especially, secondary batteries have been demanded to be compact and light. For these electronic devices, there have been used nickel-cadmium secondary batteries, lead-acid batteries and nonaqueous electrolyte batteries using active materials capable of doping with and dedoped from lithium, what is called, lithium type batteries.

Particularly, the lithium type batteries such as lithium batteries or lithium-ion batteries have advantages, among these batteries, that they are high in their battery voltage, energy density, low in their self-discharge and excellent in their cyclic characteristics. Accordingly, these lithium type batteries have been used as practical and commercial batteries.

In recent years, it has been necessary for the lithium type batteries to have battery forms adapted to the forms of the electronic devices. The lithium type batteries need to have, for example, forms of sheets or forms of strips so that they can be mounted on the electronic devices such as hardwares.

Since liquid type batteries using nonaqueous electrolyte solution as electrolytes employ metallic cans as outer jacket materials in order to prevent the leakage of liquid and ensure a safety, the forms of the batteries cannot be changed. Therefore, it is difficult to adapt the forms of the liquid type batteries to the forms of the electronic devices, and, the batteries having, for example, the shapes of sheets or the shapes of strips cannot be realized.

Thus, solid electrolyte batteries using solid electrolytes in which there is no fear that liquid as the electrolyte leaks and laminate films or the like are used as the outer jacket materials are put to practical use. Since the solid electrolytes and the laminate films used for the outer jacket materials are excellent in their flexibility, the solid electrolyte batteries having the solid electrolytes and the laminate films are also excellent in their flexibility. The batteries can be relatively easily formed into the shapes of sheets or the shapes of strips.

When the multi-function of the hardware is taken into consideration, the battery needs to have a high capacity, so that the area of the electrode having the composite mixture layer and the current collector needs to be widely and adequately ensured. When the electrode has a single-layer structure, a wide electrode area is required in order to achieve a desired battery capacity. Further, for the outer jacket of the battery, an area equal to or more than the area of the electrode is necessary. Accordingly, when the area of the electrode is increased in the electrode having the single-layer structure, the uses thereof are inconveniently restricted and a manufacture cost is disadvantageously increased. Thus, there is made a proposal that an electrode has a multi-layer structure by forming a composite mixture layer and laminating, for instance, a rectangular current collector to ensure a wide electrode area and achieve a desired battery capacity and make an external form of the battery compact.

However, when the electrode has the multi-layer structure by laminating the current collectors, it is necessary to pull out leads respectively from the current collectors upon manufacturing the electrode, so that a volume energy density is decreased for the leads. Accordingly, it is inconveniently difficult to more increase a high capacity.

Further, when the electrode has the multi-layer structure, since various kinds of steps such as cutting a lead for each current collector and welding and connecting the lead are required, there exist problems that a manufacture cost is high, much labors and time are required for producing the battery and a productivity is not good.

SUMMARY OF THE INVENTION

With the above problems taken into consideration, the present invention is proposed for the purpose of providing a battery of a new form having an excellent productivity and capable of contributing a high capacity in a battery of a constant form, in which a multi-layer structure can be formed, a lead may be pulled out as little as required, specifically, a part of the lead may be pulled out only at one end part of a current collector, and a method for manufacturing the battery.

For achieving the above-described purpose, an electrode according to the present invention comprises a composite mixture layer formed by applying a composite mixture including one of a cathode active material or an anode active material on one of main surfaces of a plurality of current collectors formed in substantially rectangular shapes and a non-applied part to which the composite mixture is not applied at both end parts in the longitudinal direction, wherein one current collector is connected to the other adjacent current collector at one end side in the longitudinal direction through a connecting part to which the composite mixture is not applied and which is provided continuously to the non-applied parts.

In the electrode according to the present invention constructed as mentioned above, since a plurality of current collectors are connected through the connecting parts, one current collector is electrically connected to the other current collector. Accordingly, in the electrode according to the present invention, a plurality of current collectors can be laminated to have a multi-layer structure and an electric current can be collected from a lead welded only to one end part of the current collector.

Further, according to the present invention, there is provided a battery comprising a cathode including a composite mixture layer formed by applying a composite mixture including a cathode active material on one of main surfaces of a plurality of current collectors formed in substantially rectangular shapes and a non-applied part to which the composite mixture is not applied at both end parts in the longitudinal direction, wherein one current collector is connected to the other adjacent current collector at one end side in the longitudinal direction through a connecting part to which the composite mixture is not applied and which is provided continuously to the non-applied parts; an anode including an anode active material; and a solid electrolyte film.

In the battery according to the present invention constructed as mentioned above, since a plurality of current collectors are connected through the connecting parts, one current collector is electrically connected to the other current collector. Accordingly, in the battery according to the present invention, a plurality of current collectors can be laminated to have a multi-layer structure and an electric current can be collected from a lead welded only to one end part of the current collector.

Further, according to the present invention, there is provided a method for manufacturing an electrode comprising: an original sheet forming step in which is formed an original sheet having a composite mixture layer formed by applying a composite mixture including one of a cathode active material or an anode active material on one of main surfaces of a plurality of current collectors and a non-applied part to which the composite mixture is not applied at both end parts in the longitudinal direction; and an original sheet cutting step in which the original sheet is cut to form a plurality of substantially rectangular current collectors and one current collector is connected to the other adjacent current collector at one end side in the longitudinal direction through a connecting part to which the composite mixture is not applied and which is provided continuously to the non-applied parts.

In the method for manufacturing an electrode of the present invention constructed as mentioned above, a plurality of current collectors are connected together through the connecting parts so that one current collector is electrically connected to the other current collector. Thus, according to the method for manufacturing an electrode of the present invention, there can be manufactured the electrode in which a plurality of current collectors can be laminated to have a multi-layer structure and an electric current can be collected from a lead welded only to one end part of the current collector.

BRIEF DESCRIPTION OF THE DRAWINGS

The object and other objects and advantages of the present invention will be apparent more clearly from the following specification in conjunction with the accompanying drawings in which.

DETAILED DESCRIPTION OF THE PREFERRED EMBODIMENTS

Now, an electrode to which the present invention is applied and a battery using the electrode will be described in detail by referring to the accompanying drawings.

Figure 1:
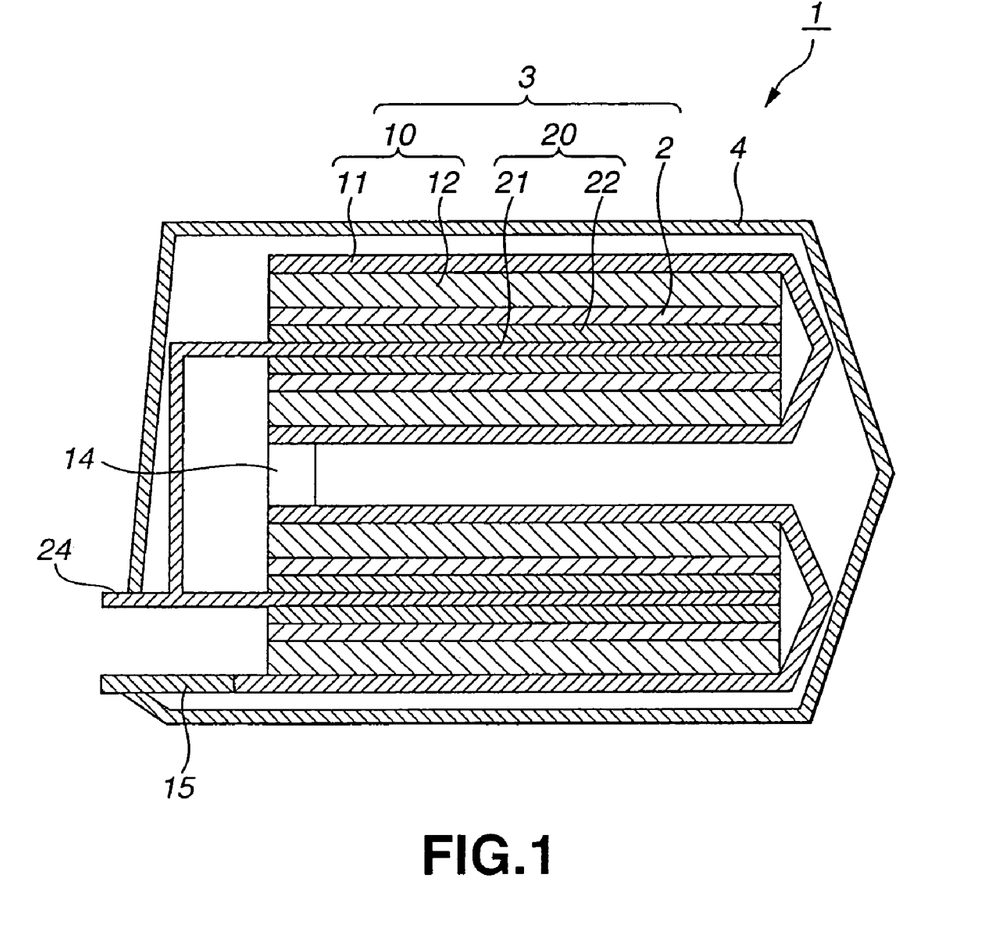
FIG. 1 is a sectional view of a battery.

A battery 1 has an element 3 including a cathode 10, an anode 20 and a solid electrolyte film 2 as shown in FIG. 1. Further, in the battery 1, the element 3 is covered with an outer jacket film 4.

Figure 2A:
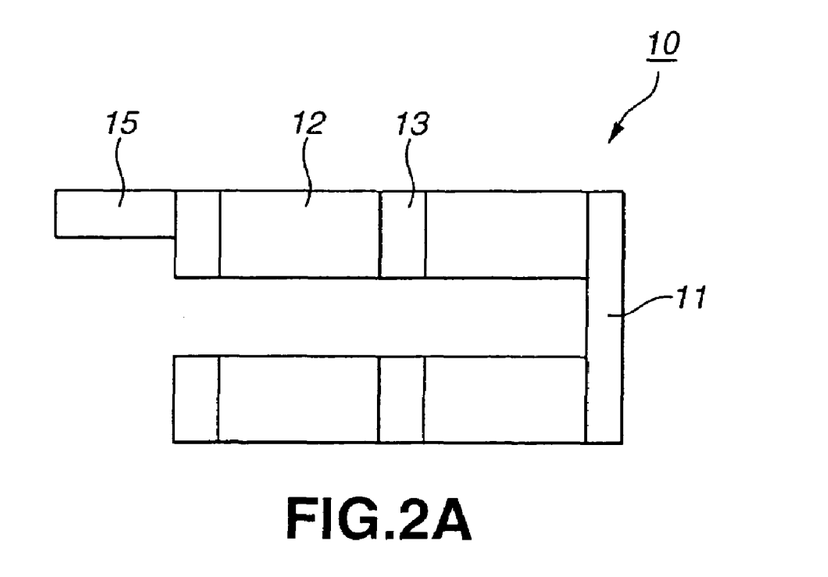
FIG. 2A is a schematic view of a cathode and FIG. 2B is a perspective view of a cathode to which the present invention is applied.
Figure 2B:
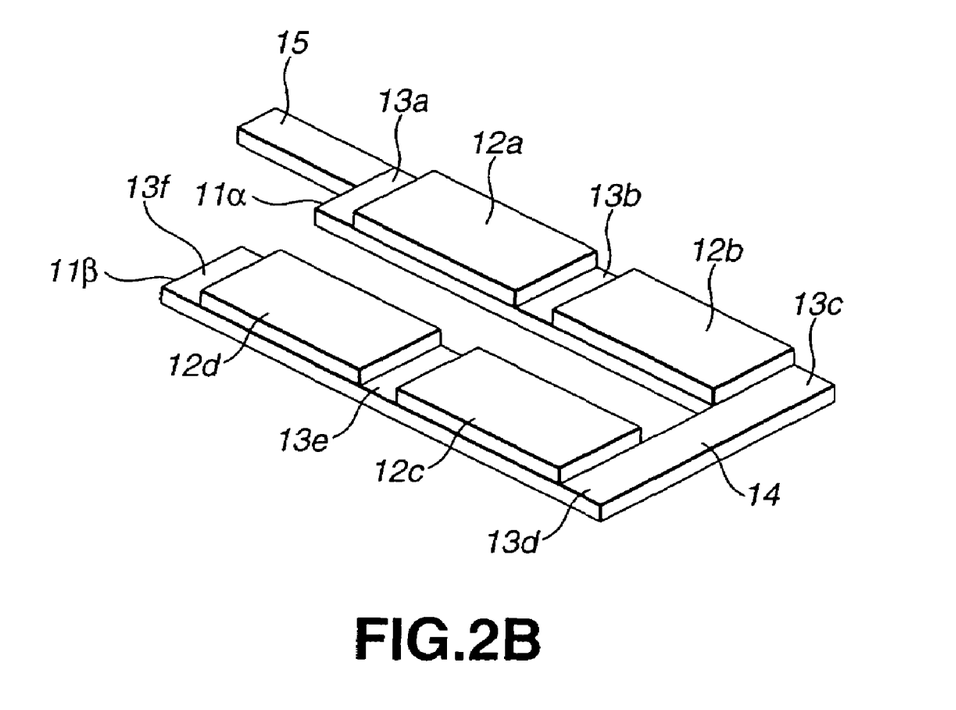

The cathode 10 includes, as shown in FIG. 2, a cathode composite mixture layer 12 to which a cathode composite mixture containing a cathode active material is applied on one of the main surfaces of a plurality of cathode current collectors 11 formed in substantially rectangular shapes and a non-applied part 13 to which the composite mixture is not applied at both end parts in the longitudinal direction. One cathode current collector 11 is connected to the other adjacent cathode current collector 11 at one end side in the longitudinal direction through a connecting part 14 to which the composite mixture is not applied and which is provided continuously to the non-applied part 13. Further, at one end part of the cathode current collector 11, a cathode lead 15 is provided.

More specifically, the cathode 10 comprises a non-applied part 13a to which the composite mixture is not applied at one end in the longitudinal direction of one cathode current collector 11α, a first cathode-composite mixture layer 12a adjacent to the non-applied part 13a, a non-applied part 13b opposite and adjacently to the non-applied part 13a side of the first cathode composite mixture layer 12a, a second cathode composite mixture layer 12b opposite and adjacent to the first cathode composite mixture layer 12a side of the non-applied part 13b, a non-applied part 13c opposite and adjacently to the non-applied part 13b side of the second cathode composite mixture layer 12b, a connecting part 14 to which the cathode composite mixture is not applied and which is provided continuously to the non-applied part 13c, a non-applied part 13d provided continuously to the connecting part 14 in another cathode current collector 11β, a third cathode composite mixture layer 12c adjacent to the non-applied part 13d, a non-applied part 13e opposite and adjacently to the non-applied part 13d side of the third cathode composite mixture layer 12c, a fourth cathode composite mixture layer 12d opposite and adjacently to the third cathode composite mixture layer 12c side of the non-applied part 13e and a non-applied part 13f opposite and adjacently to the non-applied part 13e side of the fourth cathode composite mixture layer 12d.

Figure 3A:
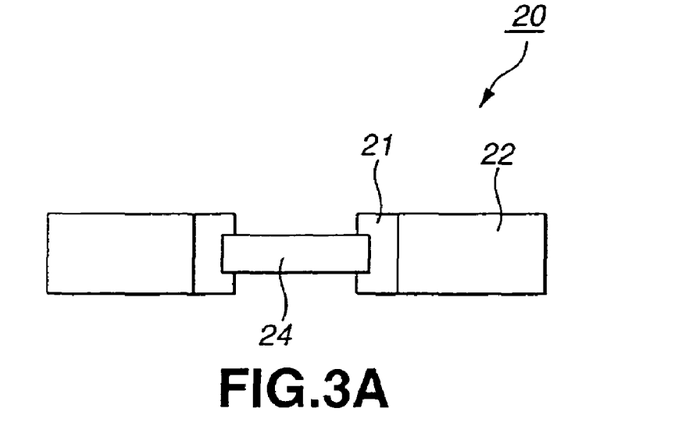
FIG. 3A is a schematic view of an anode and FIG. 3B is a sectional view of an anode to which the present invention is applied.
Figure 3B:
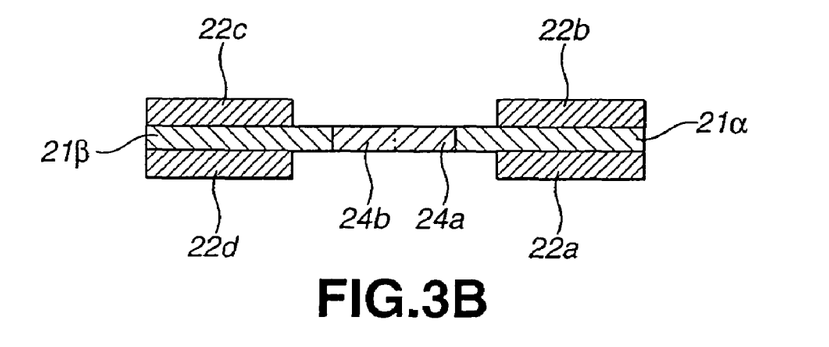

The anode 20 to be combined with the cathode 10 comprises, as shown in FIG. 3, a plurality of anode current collectors 21 formed in substantially rectangular shapes and anode composite mixture layers 22 formed on both the surfaces of the anode current collectors 21 and including anode active materials. An anode lead 24 is provided at one end of the anode current collector 21.

More specifically, the anode 20 comprises an anode composite mixture layer 22a formed on one surface of one anode current collector 21 α, an anode composite mixture layer 22b formed on the other surface of one anode current collector 21 α, an anode composite mixture layer 22c on one surface of the other anode current collector 21β and an anode composite mixture layer 22d formed on the other surface of the other anode current collector 21β. In the anode 20, one anode lead 24a is formed integrally with other anode lead 24b.

In the element 3, as shown in FIG. 1, the cathode 10 is bent at the non-applied parts 13 so that the anode composite mixture layers 22 provided on both the surfaces of the anode 20 are sandwiched in between one cathode composite mixture layer 12 and the other cathode composite mixture layer 12 provided on the main surface of the cathode 10 through the solid electrolyte film 2. In other words, the battery 1 has an electrode having a laminate structure in which the cathode 10 and the anode 20 are laminated.

In order to assuredly increase an electrode area and obtain a high capacity, it has been hitherto necessary to pull out cathode leads respectively from the cathode current collectors and collect an electric current from a cathode formed by laminating a plurality of cathode current collectors on which cathode composite mixture layers are formed. Consequently, since each cathode lead inconveniently needs to be welded to each cathode current collector, much time and much labor have been required so that the productivity of the cathode has been seriously deteriorated. Further, when the cathode lead is pulled out for each cathode current collector, the volume of the cathode needs to be decreased for the volume of the cathode lead occupied in the battery, and accordingly, the high capacity of the battery cannot be disadvantageously achieved.

On the contrary, the cathode 10 to which the present invention is applied is provided with a plurality of cathode current collectors 11 and has a structure that the plural cathode current collectors 11 are laminated. Since one cathode current collector 11α and the other adjacent cathode current collector 11β are connected together at one end side in the longitudinal direction through the connecting part 14 to which the cathode composite mixture is not applied, the one cathode current collector 11α is electrically connected to the other cathode current collector 11β. Accordingly, in the cathode 10 to which the present invention is applied, one cathode current collector 11α can be laminated on the other current collector 11β to have a multi-layer structure and the cathode lead 15 may be welded to only one end part of the cathode current collector 11 so as to collect an electric current.

As described above, the cathode 10 to which the present invention is applied is a cathode having a new form which has not seen in conventional cathodes. Additionally, since labor and time for welding the cathode lead 15 to the cathode current collector are outstandingly reduced as compared with those of the conventional cathode with a lamination structure, the productivity of the cathode is extremely excellent. Further, in the cathode 10 to which the present invention is applied, since the occupied volume of the cathode lead 15 located in the battery 1 is outstandingly lower than that of the cathode lead pulled out from the cathode having the conventional lamination structure, the battery 1 can be made compact while the electrode area of the conventional battery is maintained. Besides, while the external dimension of the battery 1 is maintained, the electrode area can be increased and a high capacity per unit volume can be achieved.

As for the cathode composite mixture layer 12 of the cathode 10, only one block may be provided on each cathode current collector 11. However, in order to achieve a desired battery capacity, a plurality of blocks of cathode composite mixture layers 12 may be provided in accordance with an intermittent application, as shown in FIG. 2.

Figure 4:
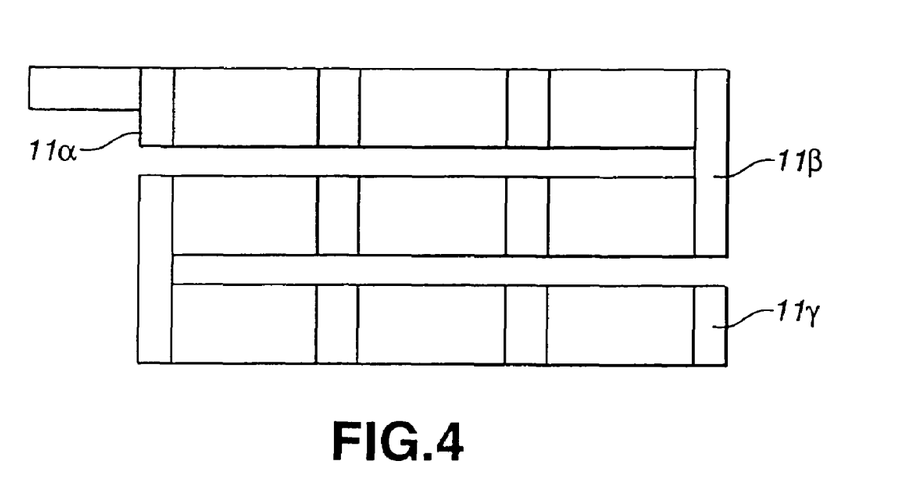
FIG. 4 is a schematic view of another cathode to which the present invention is applied.

As another cathode to which the present invention is applied, the other cathode current collector 11β may be connected to a still another adjacent cathode current collector 11γ at the other end side in the longitudinal direction, as shown in FIG. 4.

The above-described cathode 10 includes the cathode composite mixture layer 12 formed by applying on the main surface of the cathode current collector 11 the cathode composite mixture prepared by dispersing a cathode active material and a binding agent in an organic solvent. There are utilized materials described below.

As the cathode active materials, there may be used metallic sulfides or metallic oxides such as $TiS_2$, $MoS_2$, $NbSe_2$, $V_2O_5$, etc. Further, there may be employed lithium composite oxides or the like including as a main component $Li_xMO_2$ (in the formula, M designates one or more kinds of transition metals and x is different depending on the charging and discharging states of a battery and ordinarily 0.05 or higher and 1.10 or lower.). As the transition metals M which constitute the lithium composite oxides, Co, Ni, Mn, etc. are preferably employed. As the specific examples of the lithium composite oxides, there may be exemplified $LiCoO_2$, $LiNiO_2$, $LiNi_yCo_{1-y}O_2$ (in the formula, y is located within a range expressed by 0<y<1.), $LiMn_2O_4$, etc. Especially, as the cathode active material, $LiCoO_2$ is preferably used.

As the binding agent, there may be used well-known binding agents such as polyvinylidene fluoride (PVDF), polyacrylonitrile (PAN), etc.

As the organic solvents, there may be used anhydrides such as acetonitrile, N-methyl pyrrolidone (NMP), tetrahydrofuran, etc.

The thickness of the cathode composite mixture layer 12 is properly selected depending on a desired battery performance and a battery form. The cathode composite mixture layer is preferably compression-molded by a press machine or the like so that the thickness of the layer after a pressing operation is about 5 μm to 50 μm.

As the cathode current collector 11, aluminum or the like can be employed. The thickness of the cathode current collector 11 is adequately selected depending on the desired battery performance and the battery form. The thickness of the cathode current collector 11 is preferably located within a range of about 5 μm to 50 μm.

The above-described anode 20 includes anode composite mixture layers 22 formed by applying on both the surfaces of an anode current collector 21 an anode composite mixture prepared by dispersing an anode active material and a binding agent in an organic solvent. There are utilized materials as described below.

As the anode active materials, there are preferably used lithium metals, lithium alloys and materials capable of being doped with or dedoped from lithium or lithium ions. As the materials capable of being doped with or dedoped from lithium or lithium ions, there may be exemplified carbonaceous materials including pyrocarbons, coke (pitch coke, needle coke, petroleum coke, etc.), graphites, vitreous carbons, organic polymer compound sintered bodies (bodies obtained by sintering and carbonizing phenolic resins, furan resins, etc. at suitable temperature), carbon fibers, activated carbons, etc. Further, as the materials capable of being doped with or dedoped from lithium or lithium ions, there may be used polymers such as polyacetylene, polypyrrole, etc. Still further, as the lithium alloys, for instance, there may be exemplified lithium-aluminum alloy, etc.

The thickness of the anode composite mixture layer 22 is suitably selected depending on a desired battery performance and a battery form. The anode composite mixture layer is preferably compression-molded by a press machine or the like so that the thickness of the anode composite mixture layer reaches about 3 μm to 50 μm.

As the anode current collector 21, copper or the like can be employed. The thickness of the anode current collector 21 is properly selected depending on the battery performance or the battery form. The thickness of the anode current collector 21 is preferably about 1 μm to 100 μm.

The above-described solid electrolyte film 2 includes solid electrolytes enumerated in, for example, Japanese Patent Application Laid-Open No. hei 11-185773 and Japanese Patent Application Laid-Open No. hei 8-222235 or the like, siloxane, lithium salts, and a binding agent such as TMPT (Trimethylol-propane trimethacrylate) etc. Especially, as the solid electrolytes, there are preferably used polyethylene oxide derivatives, ethylene oxide copolymers, etc.

As the outer jacket film 4, a metal foil, an aluminum laminate film or the like can be employed.

The cathode 10 formed as mentioned above is manufactured in the following manner.

Initially, the cathode composite mixture including the cathode active material is applied to the main surfaces of the cathode current collector 11 to form the cathode composite mixture layers 12. An original sheet forming step is carried out in which original sheets having the non-applied parts 13 to which the cathode composite mixture is not applied at both ends in the longitudinal direction of the cathode current collector 11 are formed.

In the original sheet forming step, the cathode composite mixture obtained by dispersing the cathode active material and the binding agent in the organic solvent is firstly prepared. Then, the cathode composite mixture is applied to the main surfaces of the cathode current collector 11 and dried to form the cathode composite mixture layers 12. The non-applied parts 13 to which the cathode composite mixture is not applied are formed to both the ends in the longitudinal direction of the cathode current collector 11. The thickness of the cathode composite mixture layer 12 is properly changed depending on a desired battery performance, and preferably, for instance, 20 µm to 60 µm.

Further, in the original sheet forming step, the cathode composite mixture layer 12 including a plurality of blocks by an intermittent application may be provided. When the cathode composite mixture layer 12 undergoes an intermittent application, the length of application for each block in the longitudinal direction of the cathode composite mixture layer 12 is suitably changed depending on the desired battery performance. For example, the length of application of the cathode composite mixture layer 12 is set to about 180 mm.

As methods for applying the cathode composite mixture layer 12 to the cathode current collector, any of conventionally known methods may be usable. There may be utilized, for example, a spin coating method, a roll coating method, a dye coating method, blade coating method, an ink jet application method, an electrodeposition method, a printing method, a dispenser application method, a dry film transfer method, a spray and application method, a stamping and transfer method, a dip coating method, a heat transfer method, a spray transfer method, a brush application method, an electrolytic application method, a magnetic field application method, a dyeing method, etc.

Subsequently, an original sheet cutting step is carried out in which the original sheets are cut to form a plurality of cathode current collectors 11 having substantially rectangular shapes and one cathode current collector 11α is connected to the other adjacent cathode current collector 11β at one end side in the longitudinal direction through the connecting part 14 to which the cathode composite mixture is not applied and which is provided continuously to the non-applied parts 13.

When the original sheets are cut to form the plural cathode current collectors 11, the length and width in the longitudinal direction of each cathode current collector 11 are properly changed depending on desired battery characteristics. The cathode current collector is preferably formed in a rectangular shape having, for instance, the length of about 200 mm and the width of about 5 mm.

Further, in the original sheet cutting step, the other cathode current collector 11β may be connected to a still other adjacent cathode current collector 11γ at the other end side in the longitudinal direction.

In such a way, the cathode 10 to which the present invention is applied is manufactured. After the original sheet cutting step, the cathode may be additionally formed by pressing the cathode while the cathode 10 is heated. Although the cathode composite mixture layer 12 obtained immediately after the cathode composite mixture is applied to the cathode current collector and dried is easily additionally formed because it is porous, the cathode composite mixture layer is apt to be peeled off and inferior in its electronic conductivity. The cathode composite mixture layer is additionally formed so that it is hardly peeled off and the electronic conductivity of the cathode composite mixture layer 12 is improved.

Further, the battery 1 having the cathode 10 formed as mentioned above is manufactured in the following manner.

Figure 5:
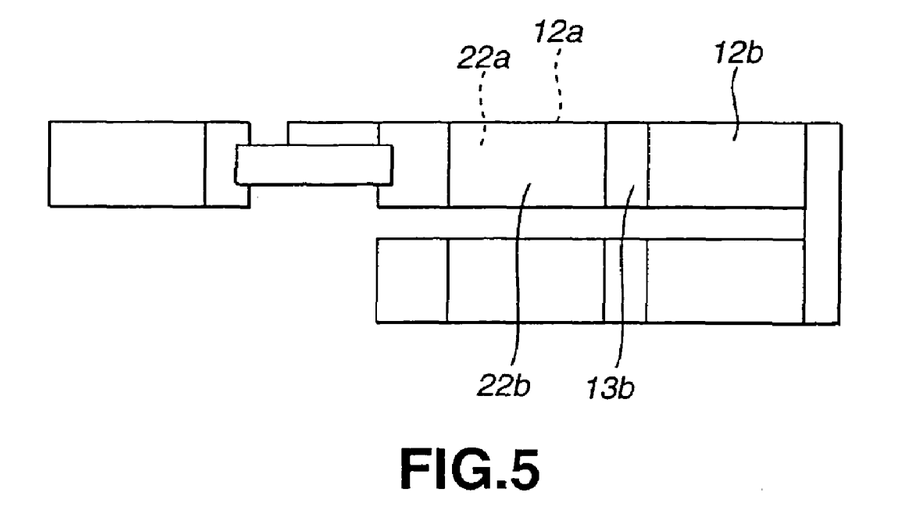
FIG. 5 is a schematic view showing a state that a battery having a cathode to which the present invention is applied is manufactured.

Initially, the element 3 is manufactured as described below. After a solid electrolyte film 2 which is not depicted is stuck to the anode composite mixture layers 22a, 22b, 22c and 22d, the anode composite mixture layer 22a is stuck to the cathode composite mixture layer 12a as shown in FIG. 5.

Figure 6:
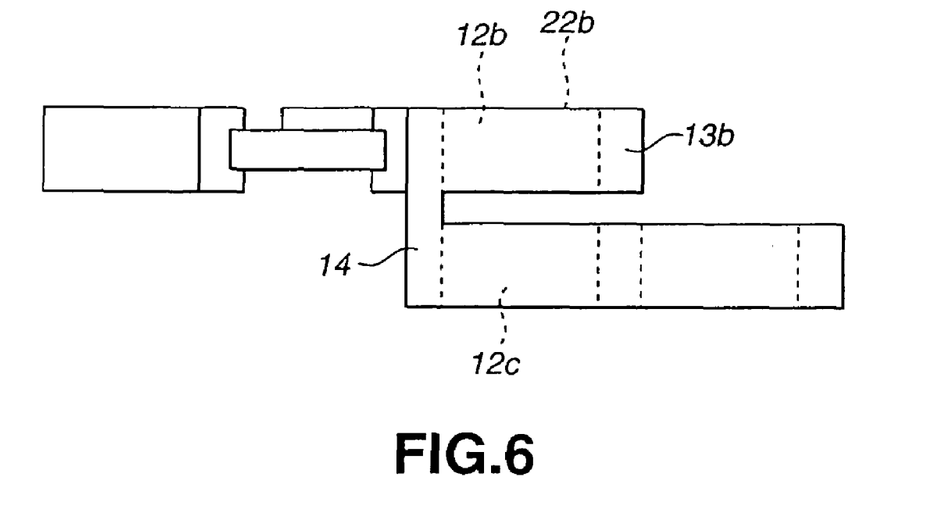
FIG. 6 is a schematic view showing a state that a battery having a cathode to which the present invention is applied is manufactured.

Then, as shown in FIG. 6, the non-applied part 13b is bent on a bottom bending direction to stick the anode composite mixture layer 22b to the cathode composite mixture layer 12b.

Figure 7:
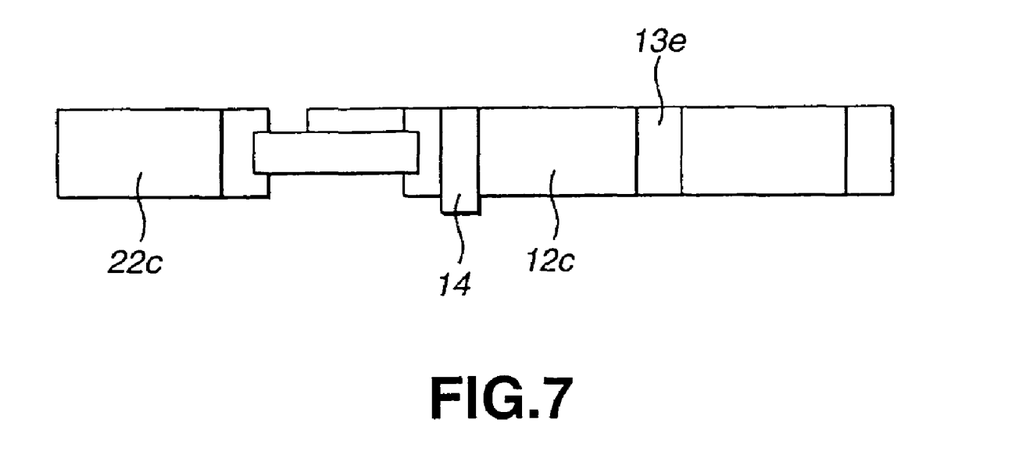
FIG. 7 is a schematic view showing a state that a battery having a cathode to which the present invention is applied is manufactured.

Subsequently, as shown in FIG. 7, the connecting part 14 is bent on a bottom direction in the same direction as the longitudinal direction of the cathode so that the surface of the cathode current collector 11 opposite to the surface on which the cathode composite mixture layer 12b is stuck to the surface of the cathode current collector 11 opposite to the surface on which the cathode composite mixture layer 12c is formed.

Figure 8:
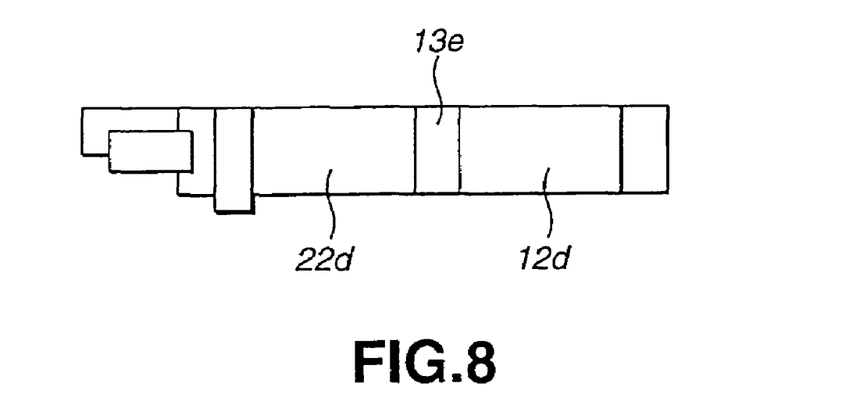
FIG. 8 is a schematic view showing a state that a battery having a cathode to which the present invention is applied is manufactured.

Then, as shown in FIG. 8, the cathode composite mixture layer 12c is stuck to the anode composite mixture layer 22c.

Then, the non-applied part 13e is bent on a bottom bending direction to stick the anode composite mixture layer 22d to the cathode composite mixture layer 12d and form the element 3.

After that, a step for externally covering the element 3 with the outer jacket film 4 is carried out. The element 3 is externally covered with the outer jacket film 4 under a vacuum and pressure reducing atmosphere. The battery 1 is manufactured in such a manner as described above.

It is to be understood that the present invention is not limited thereto. An anode may be formed in a configuration as shown in FIG. 2, that is, the anode comprises a composite mixture layer formed by applying an anode composite mixture including an anode active material on one of main surfaces of a plurality of anode current collectors formed in substantially rectangular shapes; and a non-applied part to which the composite mixture is not applied at both end parts in the longitudinal direction, wherein one anode current collector is connected to the other adjacent anode current collector at one end side in the longitudinal direction through a connecting part to which the anode composite mixture is not applied and which is provided continuously to the non-applied parts and an anode lead is provided at one end part of the anode current collector.

As a cathode to be combined with this anode in the battery, the cathode having a configuration as shown in FIG. 3 is preferable, that is, the cathode comprising a plurality of cathode current collectors formed in substantially rectangular shapes and cathode composite mixture layers formed both the surfaces of the cathode current collectors and including cathode active materials, wherein a cathode lead is provided at one end of the cathode current collector.

As apparent from the above description, in the electrode according to the present invention, a plurality of current collectors are electrically connected together through the connecting part. Accordingly, a plurality of current collectors can be laminated to have a multi-layer structure and the electric current can be collected from the lead welded to only one end part of the current collector.

Accordingly, in the electrode according to the present invention, since labor and time required for welding the lead to the current collector are outstandingly reduced as compared with those of the conventional electrode with a lamination structure, the productivity of the electrode is extremely excellent. Further, since the occupied volume of the lead located in the battery is outstandingly lower than that of the lead pulled out from the electrode having the conventional lamination structure, the battery can be made compact while the electrode area of the conventional battery is maintained. Besides, while the external dimension of the battery is maintained, the electrode area can be increased and a high capacity per unit volume can be achieved.

Further, in the method for manufacturing an electrode according to the present invention, since a plurality of current collectors are electrically connected together through the connecting part, the plural current collectors can be laminated in the battery to realize a multi-layer structure. Further, there can be produced an electrode capable of collecting an electric current from the lead welded to only one end part of the current collector.

Accordingly, in the method for an electrode according to the present invention, since labor and time necessary for welding the lead to the current collector are outstandingly reduced as compared with those required for the steps for manufacturing the conventional electrode with a lamination structure, the electrode can be manufactured with very high production efficiency. Further, since the occupied volume of the lead located in the battery is outstandingly lower than that of the lead pulled out from the electrode having the conventional lamination structure, the battery can be made compact while the electrode area of the conventional battery is maintained. Besides, while the external dimension of the battery is maintained, the electrode area can be increased and a high capacity per unit volume can be achieved.

What is claimed is:

1. A method for manufacturing a battery comprising:
   a cathode sheet forming step in which a composite mixture layer including a cathode active material is formed over portions of a surface of a current collector sheet with non-applied portions therebetween to form a cathode current collector sheet;
   a cathode current collector sheet cutting step in which the cathode current collector sheet is cut to form a plurality of substantially rectangular cathode current collectors,
   a first connecting step in which a first cathode current collector is connected to a second cathode current collector at one end side in the longitudinal direction through a connecting part to which the composite mixture is also not applied, thus forming a connected cathode structure;
   a step of providing a plurality of anode current collectors formed in substantially rectangular shapes;
   a step of forming anode composite mixture layers including an anode active material over portions of both opposing surfaces of the anode current collectors;
   a second connecting step in which a first anode current collector is connected to a second anode current collector at one end side in the longitudinal direction of each anode current collector via a lead to which the anode active material is not applied, thus forming a connected anode structure;
   a step of forming a solid electrolyte layer over either the cathode active material portions or the anode active material portions, or both, but wherein substantially no electrolyte material is formed in regions of the connected cathode structure other than where cathode active material is formed and substantially no electrolyte material is formed in regions of the connected anode structure other than where anode active material is formed;
   a step of bending each of the cathode current collectors at a non-applied portion and sandwiching each anode current collector between a corresponding bent cathode current collector such that the anode composite mixture layers formed on opposing surfaces of each anode current collector are sandwiched in between one cathode composite mixture layer and another cathode composite mixture layer provided on the surface of each cathode current collector with the solid electrolyte film therebetween.

2. The method for manufacturing a battery according to claim 1, wherein the second cathode current collector is connected to a further third cathode current collector.

3. The method for manufacturing a battery according to claim 1, wherein each of the composite mixture layers constitutes a plurality of blocks formed by an intermittent application.

4. The method for manufacturing a battery according to claim 1, wherein, once assembled, there is a non-conducting void between each bent portion of each cathode current collector, and a corresponding end portion of the anode current collector adjacent the bent portion of each cathode current collector.

5. The method for manufacturing a battery according to claim 1, wherein each anode current collector terminates at a point adjacent the non-applied bent portion of each respective cathode current collector.

* * * * *